United States Patent Office.

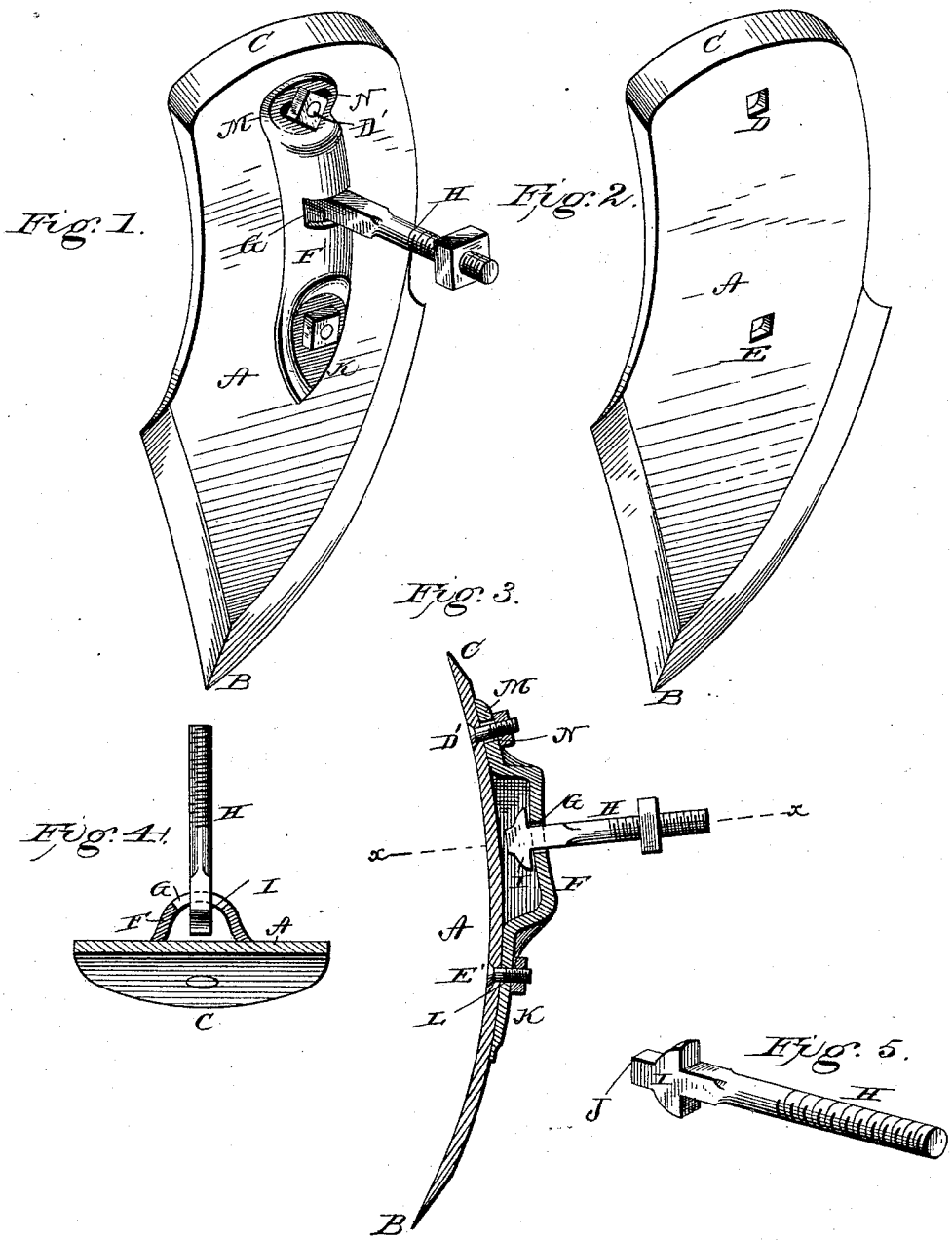

JOHN A. JOHNSON, OF MADISON, WISCONSIN.

REVERSIBLE CULTIVATOR-SHOVEL.

SPECIFICATION forming part of Letters Patent No. 390,479, dated October 2, 1888.

Application filed March 16, 1888. Serial No. 267,372. (No model.)

*To all whom it may concern:*

Be it known that I, JOHN A. JOHNSON, a citizen of the United States, and a resident of Madison, in the county of Dane and State of Wisconsin, have invented certain new and useful Improvements in Reversible Cultivator-Shovels; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective rear view of my improved reversible cultivator-shovel with its removable bearing and attachments. Fig. 2 is a similar view of the shovel detached from its bearing. Fig. 3 is a longitudinal sectional view of the shovel and attachments. Fig. 4 is a cross-section through a plane denoted by the broken line $x\,x$ in Fig. 3, and Fig. 5 is a perspective detail view of the bolt or fastening whereby the shovel is attached to the shovel-standard.

Like letters of reference denote corresponding parts in the several figures.

My invention has relation to reversible blades or shovels for cultivators—that is to say, blades or shovels of that class which may be reversed upon the standard, so as to permit the use of both ends of the shovel; and my improvement consists in the peculiar construction of the shovel itself, and also in its combination with the peculiar shoe, whereby the same is attached to the cultivator-standard in such a manner as to permit of its reversal in a simple and expeditious manner.

In the accompanying drawings, the letter A denotes my improved reversible cultivator-shovel, which is made of steel and provided at one end with a sharpened point, B, and at the other or opposite end with a curved and sharpened edge, C. Through the middle part of the body of the plate are punched two square holes, (denoted by D and E,) which are countersunk on the front side of the shovel to receive the heads of bolts D' and E', the heads of these bolts being ground off smooth with the front side or face of the shovel, as will be seen more clearly by reference to Fig. 3 of the drawings.

The shoe or standard consists of an elongated box or casting, F, having a hollow middle part, which is provided with a transverse slot, G, for the insertion of the bolt H, whereby the shovel is fastened upon the cultivator-standard. This bolt H has a square part which projects through the slot G, and is provided with a cross-head, I, the top part of which is rounded and provided with a projection, J. When the bolt has been turned so that the cross-head I stands at right angles as to the slot G, the shoe can be drawn tightly against the rear of the shovel by means of the bolts D' and E'; but when the head stands straight with the slot and its ends might engage with the shoe, and apparently would secure it in place, but in reality would only secure it in such a manner that the least strain upon it would cause it to come loose, the projection J is made long enough to strike against the back of the shovel when the cross-head stands in a line with the slot, as above described, and will prevent the shovel being drawn tightly against the shoe, and will thus indicate at a glance whether the bolt is in its proper position for holding the shovel in place or not. This construction of the cross-head permits of its insertion through the slot G from the rear side by tilting the bolt sidewise and inserting one end of the cross-head first, and then, placing the bolt at right angles, the sides of the cross-head will bind firmly against the inner side of the box on opposite sides of the slot, as shown in Fig. 4 of the drawings.

The box or casting F is provided with a downward projection, K, having a bolt-hole, L, and an upward projection, M, having a transverse slot, N. The bolts E' and D' are inserted through the hole L and the slot N, respectively, and held in place by nuts. The object of making the slot in the upper projection, M, instead of a round bolt-hole is to permit the lowermost or working part of the shovel being slightly tilted to either side if through wear or other causes it should be worn unevenly on opposite sides, and this may be done simply by loosening the nut upon bolt D', when the shovel may be tilted upon the lower bolt, E', as a fulcrum, and after it has been placed in the desired position it is again fastened securely upon its box or bearing F simply by again tightening the nut on bolt D'.

From the foregoing it will be seen that this construction is extremely simple and durable, and that the shovel may be reversed upon the standard without detaching it from its bearing. When it is desired to have the shovel run deep into the ground, the pointed end is to be used; but when, on the other hand, it is desired to run near the surface of the soil the shovels are reversed, so as to bring the curved edge C into play. This adjustment may be effected in the field by any ordinary laborer and in a moment's time, and without the use of any other tools than an ordinary wrench or key.

Having thus described my invention, I claim and desire to secure by Letters Patent of the United States—

The combination of the reversible cultivator-shovel, the hollow box or bearing provided with a bolt-hole at its lower end and a transverse slot at its upper end and having a transverse slot in its middle or bulged part, the bolts whereby the shovel is attached adjustably to the projecting ends of the box or bearing, and the bolt having a cross-head and a projection thereon adapted to be inserted through the middle slot in the box or bearing, whereby the same is adapted to be detachably secured upon the standard, substantially as and for the purpose shown and set forth.

In testimony that I claim the foregoing as my own I have hereunto affixed my signature in presence of two witnesses.

JOHN A. JOHNSON.

Witnesses:
A. E. PROUDFIT,
J. H. NICHOLS.